(12) United States Patent
Hsu et al.

(10) Patent No.: US 7,975,154 B2
(45) Date of Patent: Jul. 5, 2011

(54) CONTROLLING CIRCUIT FOR CONFIGURING RING INDICATOR PIN OF COMMUNICATION PORT

(75) Inventors: Wen-Chung Hsu, Sinjhuang (TW); Liang-An Chen, Sijhih (TW); Ming-Yen Shen, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 951 days.

(21) Appl. No.: 11/898,966

(22) Filed: Sep. 18, 2007

(65) Prior Publication Data

US 2008/0282075 A1    Nov. 13, 2008

(30) Foreign Application Priority Data

May 11, 2007    (TW) .............................. 96116939 A

(51) Int. Cl.
*G06F 1/26*    (2006.01)

(52) U.S. Cl. .............................. 713/300; 710/14; 713/1
(58) Field of Classification Search .................. 710/14; 713/1, 300
See application file for complete search history.

(56) References Cited

U.S. PATENT DOCUMENTS

| | | | |
|---|---|---|---|
| 7,313,707 B2 * | 12/2007 | Shaver et al. ................. | 713/300 |
| 7,526,584 B2 * | 4/2009 | Yu et al. .......................... | 710/62 |
| 2005/0204070 A1 | 9/2005 | Shaver et al. | |

* cited by examiner

*Primary Examiner* — Albert Wang
(74) *Attorney, Agent, or Firm* — Rabin & Berdo, P.C.

(57) ABSTRACT

A controlling circuit for a communication port having a ring indicator (RI) pin is provided. The controlling circuit includes a first selection circuit and a second selection circuit. The first selection circuit is controlled by a basic input/output system (BIOS) for determining whether an RI signal is transmitted to the RI pin. The second selection circuit is controlled by the BIOS for determining whether a first voltage or a second voltage is transmitted to the RI pin.

12 Claims, 3 Drawing Sheets

CONTROLLING CIRCUIT FOR CONFIGURING RING INDICATOR PIN OF COMMUNICATION PORT

This application claims the benefit of Taiwan application Serial No. 96116939, filed May 11, 2007, the subject matter of which is incorporated herein by reference.

BACKGROUND OF THE INVENTION

1. Field of the Invention

The invention relates in general to a controlling circuit for a communication port, and more particularly to a smart controlling circuit for a communication port.

2. Description of the Related Art

A communication port (COM PORT) is a general purpose communication protocol between electronic devices and has the features of simplicity and distant communication. The COM PORT is also used for connecting the meters of industrial instruments and improving the driving and connection.

Examples of the COM PORT include RS-232, which has 9 pins each having different function. The ninth pin is a ring indicator (RI) pin normally used for receiving an RI signal. Sometimes, a voltage of 5V or 12V is outputted via the RI pin. According to the conventional method, the RI pin and a voltage of 5V or 12V are manually short-circuited by a jumper such that the voltage of 5V or 12V is outputted via the RI pin.

However, for each manual adjustment, the host has to be disassembled so that the jumper is used for adjusting the RI pin to select one among the three states of the RI signal, the 5V voltage and the 12V voltage. However, such method is inconvenient to the user, and adjustment error may occur during each manual adjustment.

SUMMARY OF THE INVENTION

The invention is directed to a controlling circuit for a communication port. With the cooperation of a controlling circuit and a basic input/output system (BIOS), the RI pin of the communication port can be appropriately set at different states.

According to a first aspect of the present invention, a controlling circuit for a communication port having a ring indicator (RI) pin is provided. The controlling circuit includes a first selection circuit and a second selection circuit. The first selection circuit is controlled by a basic input/output system (BIOS) for determining whether an RI signal is transmitted to the RI pin. The second selection circuit is controlled by the BIOS for determining whether a first voltage or a second voltage is transmitted to the RI pin.

The invention will become apparent from the following detailed description of the preferred but non-limiting embodiments. The following description is made with reference to the accompanying drawings.

DETAILED DESCRIPTION OF THE INVENTION

A controlling circuit for a communication port (COM PORT) is provided in the invention. With the cooperation of a controlling circuit and a basic input/output system (BIOS), a ring indicator (RI) pin of the communication port can be appropriately set at different states.

Figure 1:
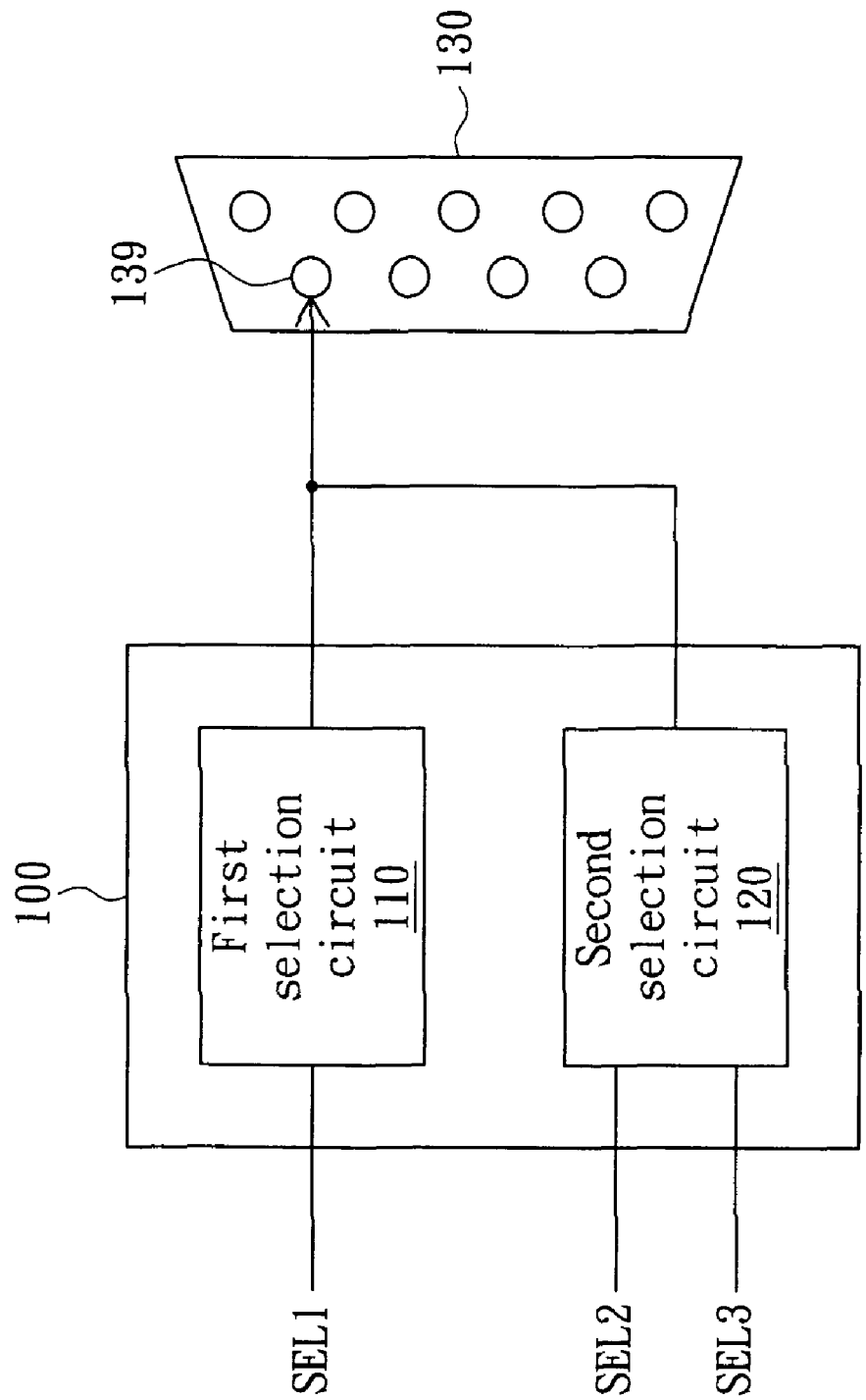
FIG. 1 is a perspective of a communication port and a controlling circuit according to a preferred embodiment of the invention.

Referring to FIG. 1, a perspective of a communication port and a controlling circuit according to a preferred embodiment of the invention is shown. A controlling circuit 100 and a communication port 130 disclosed in the present embodiment of the invention may applied to various computers such as an industrial computer. The communication port 130 has many pins including a ring indicator (RI) pin 139. The controlling circuit 100 includes a first selection circuit 110 and a second selection circuit 120.

The first selection circuit 110 is controlled by a BIOS (not illustrated) for determining whether to transmit a ring indicator (RI) signal to the RI pin 139 of the communication port 130. The BIOS transmits a first selection signal SEL1 to the first selection circuit 110 via a first general purpose input/output (GPIO) pin. When a voltage level of the first selection signal SEL1 is a high voltage level, the first selection circuit 110 transmits an RI signal to the RI pin 139. If the voltage level of the first selection signal SEL1 is a low voltage level, the first selection circuit 110 does not transmit the RI signal to the RI pin 139.

The second selection circuit 120 is also controlled by the BIOS for determining whether a first voltage or a second voltage is transmitted to the RI pin 139 of the communication port 130. The first voltage is exemplified by 5V, and the second voltage is exemplified by 12V. The BIOS transmits a second selection signal SEL2 and a third selection signal SEL3 to the second selection circuit 120 via a second GPIO pin.

When a voltage level of the second selection signal SEL2 is the low voltage level and a voltage level of the third selection signal SEL3 is the high voltage level, the second selection circuit 120 transmits the first voltage to the RI pin 139 of the communication port 130. Meanwhile, as the voltage level of the first selection signal SEL1 is the low voltage level, the first selection circuit 110 does not transmit the RI signal to the RI pin 139. When the voltage level of the second selection signal SEL2 is the high voltage level and the voltage level of the third selection signal SEL3 is the low voltage level, the second selection circuit 120 transmits the second voltage to the RI pin 139. Meanwhile, as the voltage level of the first selection signal SEL is the low voltage level, the first selection circuit 110 does not transmit the RI signal to the RI pin 139.

Figure 2:
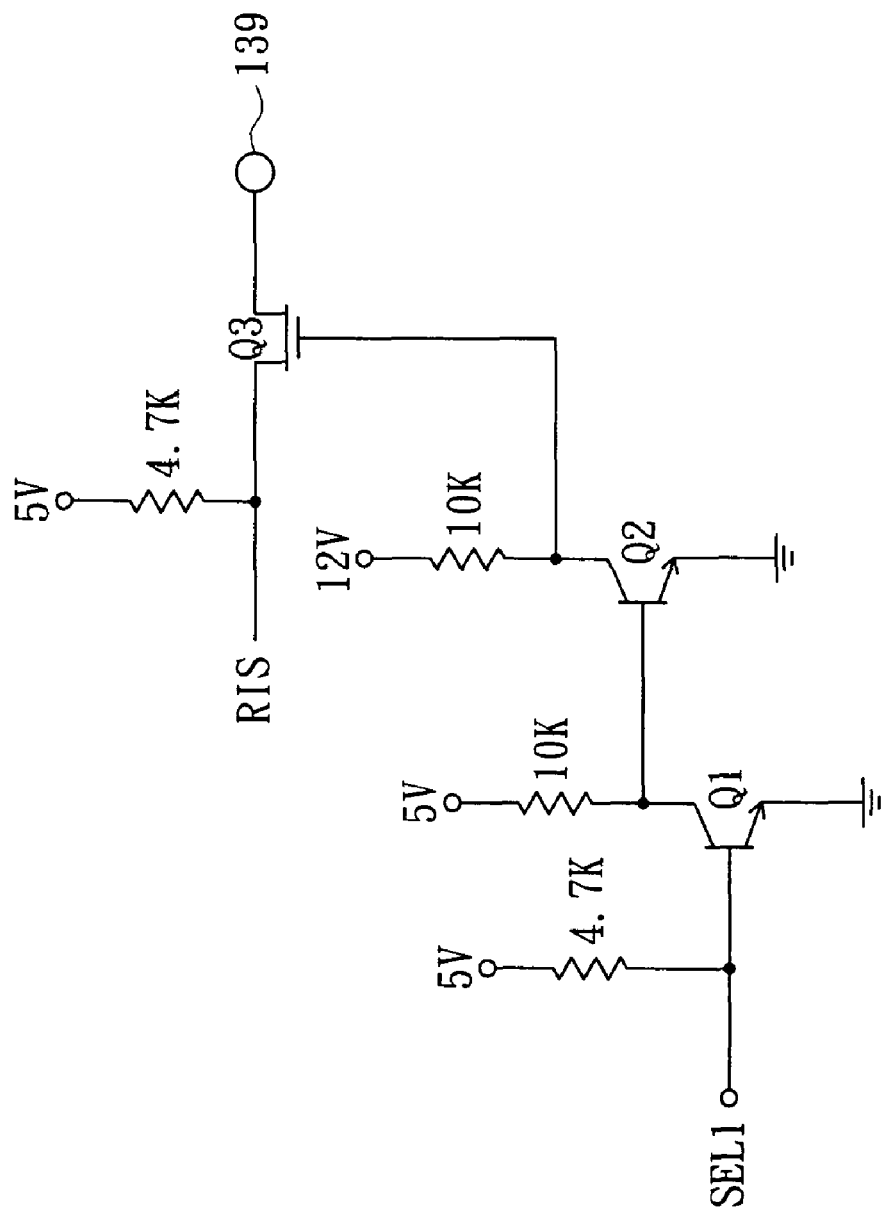
FIG. 2 is a circuit diagram of the first selection circuit 110 according to a preferred embodiment of the invention.

Referring to FIG. 2, a circuit diagram of the first selection circuit 110 according to a preferred embodiment of the invention is shown. The first selection circuit 110 includes a first switch Q1, a second switch Q2 and a third switch Q3. The first switch Q1 has a control end coupled to the first selection signal SEL1, a first end coupled to the first voltage (5V), and a second end coupled to a grounding voltage.

The second switch Q2 has a control end coupled to the first end of the first switch Q1, a first end coupled to the second voltage (12V), and a second end coupled to the grounding voltage. The third switch Q3 has a control end coupled to the first end of the second switch Q2, a first end coupled to the RI signal RIS, and a second end coupled to the RI pin 139.

In the first selection circuit 110, the first switch Q1 and the second switch Q2 substantially are NPN bipolar junction transistors (BJTs), and the third switch Q3 substantially is an NMOS field-effect transistor. When the voltage level of the first selection signal SEL1 is the high voltage level, the first switch Q1 is turned on. Meanwhile, as a voltage level of the control end of the second switch Q2 is the low voltage level, the second switch Q2 is off. Thus, the control end of the third switch Q3 is controlled by the second voltage (12V), and the third switch Q3 is turned on. After that, RI signal RIS is transmitted to the RI pin 139 via the third switch Q3.

When the voltage level of the first selection signal SEL1 is the low voltage level, the first switch Q1 is off. Meanwhile, as the voltage level of the control end of the second switch Q2 is controlled by the first voltage (5V), the second switch Q2 is turned on. Thus, a voltage level of the control end of the third switch Q3 is the low voltage level, the third switch Q3 is off, and the ring indicator signal RIS can not be transmitted to the RI pin 139 via the third switch Q3.

Figure 3:
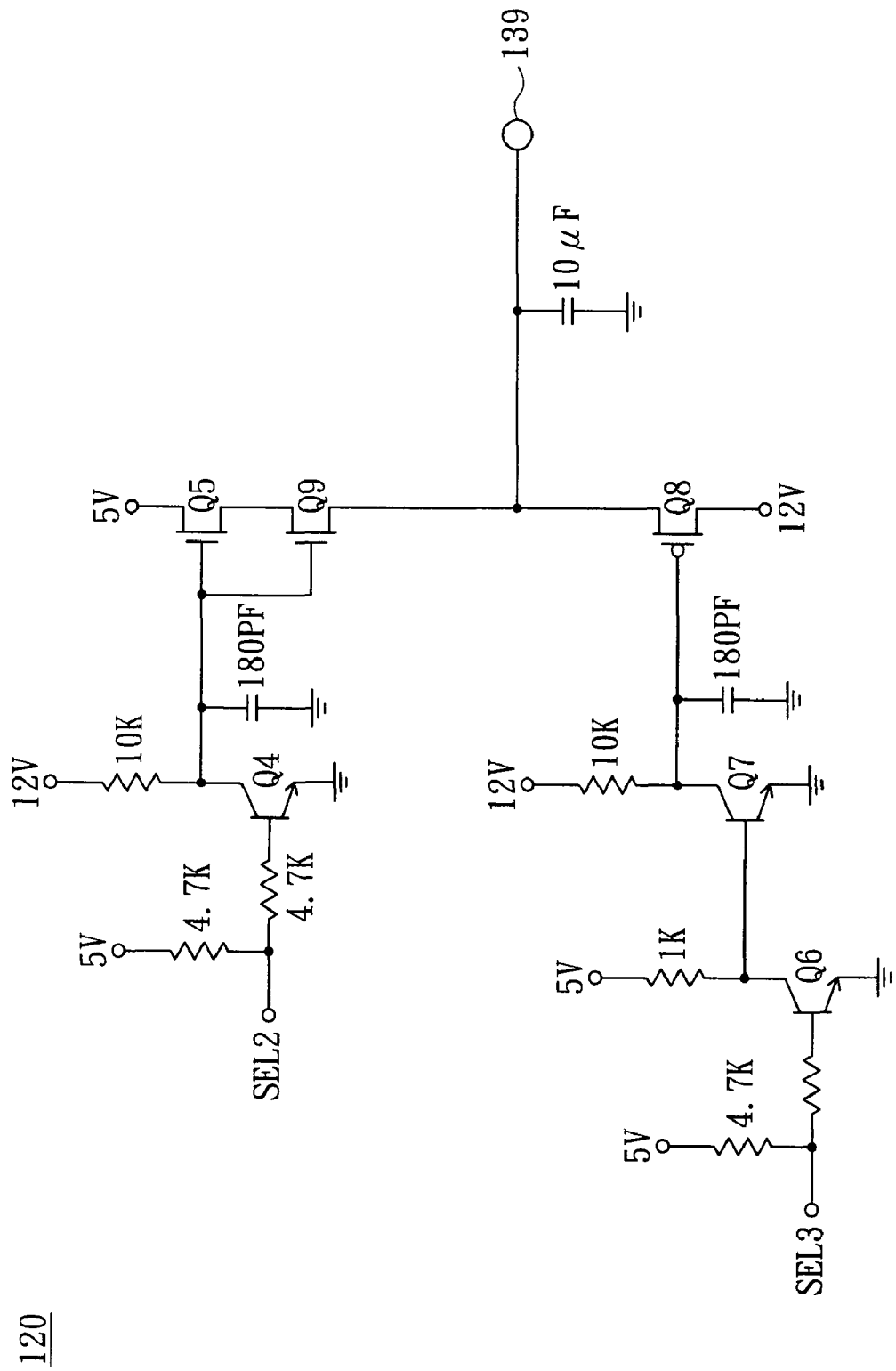
FIG. 3 is a circuit diagram of the second selection circuit 120 according to a preferred embodiment of the invention.

Referring to FIG. 3, a circuit diagram of the second selection circuit 120 according to a preferred embodiment of the invention is shown. The second selection circuit 120 includes a fourth switch Q4, a fifth switch Q5, a sixth switch Q6, a seventh switch Q7, an eighth switch Q8 and a ninth switch Q9. The fourth switch Q4 has a control end coupled to the second selection signal SEL2, a first end coupled to the second voltage (12V), and a second end coupled to the grounding voltage.

The fifth switch Q5 has a control end coupled to the first end of the fourth switch Q4, a first end coupled to the first voltage (5V), and a second end coupled to the first end of the ninth switch Q9. The ninth switch Q9 has a control end coupled to the control end of the fifth switch Q5, and a second end coupled to the RI pin 139.

The sixth switch Q6 has a control end coupled to the third selection signal SEL3, a first end coupled to the first voltage (5V), and a second end coupled to the grounding voltage. The seventh switch Q7 has a control end coupled to the first end of the sixth switch Q6, a first end coupled to the second voltage (12V), and a second end coupled to the first end of the grounding voltage. The eighth switch Q8 has a control end coupled to the seventh switch Q7, a first end coupled to the RI pin 139, and a second end coupled to the second voltage (12V).

In the second selection circuit 120, the fourth switch Q4, the sixth switch Q6 and the seventh switch Q7 substantially are NPN BJTs, the fifth switch Q5 and the ninth switch Q9 substantially are NMOS field-effect transistors, and the eighth switch Q8 substantially is a PMOS field-effect transistor. When the voltage level of the second selection signal SEL2 is the low voltage level and the voltage level of the third selection signal SEL3 is the high voltage level, the fourth switch Q4 is off. As both the control end of the fifth switch Q5 and the control end of the ninth switch Q9 are controlled by the second voltage (12V), the fifth switch Q5 and the ninth switch Q9 are turned on, such that the first voltage (5V) is transmitted to the RI pin 139 via the fifth switch Q5 and the ninth switch Q9.

Meanwhile, as the voltage level of the third selection signal SEL3 is the high voltage level, the sixth switch Q6 is turned on, and as a voltage level of the control end of the seventh switch Q7 is the low voltage level, the seventh switch Q7 is off. As the control end of the eighth switch Q8 is controlled by the second voltage (12V), the eighth switch Q8 is off and the second voltage (12V) can not be transmitted to the RI pin 139 via the eighth switch Q8. At this time, as the voltage level of the first selection signal SEL is the low voltage level, the first selection circuit 110 does not transmit the RI signal to the RI pin 139.

When the voltage level of the second selection signal SEL2 is the high voltage level and the voltage level of the third selection signal SEL3 is the low voltage level, the fourth switch Q4 is turned on. As both a voltage level of the control end of the fifth switch Q5 and a voltage level of the control end of the ninth switch Q9 are the low voltage level, the fifth switch Q5 and the ninth switch Q9 are off and the first voltage (5V) can not be transmitted to the RI pin 139 via the fifth switch Q5 and the ninth switch Q9.

At this time, the voltage level of the third selection signal SEL3 is the low voltage level, so that the sixth switch Q6 is off. Thus, the control end of the seventh switch Q7 is controlled by the second voltage (12V), and the seventh switch Q7 is turned on. As a voltage level of the control end of the eighth switch Q8 is the low voltage level, the eighth switch Q8 is turned on, such that the second voltage (12V) is transmitted to the RI pin 139 via the eighth switch Q8. Because the ninth switch Q9 is off, the current generated from the eighth switch Q8 when the second voltage (12V) is transmitted to the RI pin 139 will not flow back to the fifth switch Q5.

The controlling circuit for a communication port (COM PORT) disclosed in the above embodiment of the invention uses a basic input/output system (BIOS) to control the voltage level of the first selection signal, the second selection signal and the third selection signal. Then the ring indicator (RI) pin of the communication port is able to receive an RI signal, a first voltage (5V) or a second voltage (12V) automatically and appropriately by the use of a first selection circuit and a second selection circuit of the controlling circuit. As the setting of the jumper can be adjusted without having to remove the casing from the host, the operation of the electronic device is made even easier, and the cost of manufacturing and maintenance is reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A controlling circuit for a communication port having a ring indicator (RI) pin, comprising:
    a first selection circuit controlled by a basic input/output system (BIOS) for determining whether to transmit an RI signal to the RI pin; and
    a second selection circuit, controlled by the BIOS for determining whether or not to transmit a voltage to the RI pin, the voltage being either a first voltage having a first voltage level, or a second voltage having a second voltage level different than the first voltage level.

2. The controlling circuit for a communication port according to claim 1, wherein the communication port and the controlling circuit are substantially applied to an industrial computer.

3. The controlling circuit for a communication port according to claim 2, wherein the BIOS transmits a first selection signal to the first selection circuit via a first general purpose input/output (GPIO) pin, and when a voltage level of the first selection signal is a high voltage level, the first selection circuit transmits the RI signal to the RI pin.

4. The controlling circuit for a communication port according to claim 3, wherein the first selection circuit comprises:
    a first switch having a control end coupled to the first selection signal, a first end coupled to the first voltage, and a second end coupled to a grounding voltage;
    a second switch having a control end coupled to the first end of the first switch, a first end coupled to the second voltage, and a second end coupled to the grounding voltage; and
    a third switch having a control end coupled to the first end of the second switch, a first end coupled to the RI signal, and a second end coupled to the RI pin.

5. The controlling circuit for a communication port according to claim 4, wherein both the first switch and the second switch are NPN bipolar junction transistors (BJTs), and the third switch is an NMOS field-effect transistor.

6. The controlling circuit for a communication port according to claim 4, wherein the BIOS transmits a second selection signal and a third selection signal to the second selection circuit via a second GPIO pin, when a voltage level of the second selection signal is a low voltage level and a voltage level of the third selection signal is the high voltage level, the second selection circuit transmits the first voltage to the RI pin, and when the voltage level of the second selection signal is the high voltage level and the voltage level of the third selection signal is the low voltage level, the second selection circuit transmits the second voltage to the RI pin.

7. The controlling circuit for a communication port according to claim 6, wherein when the second selection circuit transmits the first voltage or the second voltage to the RI pin, the voltage level of the first selection signal is the low voltage level.

8. The controlling circuit for a communication port according to claim 6, wherein the second selection circuit comprises:
    a fourth switch having a control end coupled to the second selection signal, a first end coupled to the second voltage, and a second end coupled to the grounding voltage;
    a fifth switch having a control end coupled with the first end of the fourth switch, a first end coupled to the first voltage, and a second end coupled to the RI pin;
    a sixth switch having a control end coupled to the third selection signal, a first end coupled to the first voltage, and a second end coupled to the grounding voltage;
    a seventh switch having a control end coupled to the first end of the sixth switch, a first end coupled to the second voltage, and a second end coupled to the grounding voltage; and
    an eighth switch having a control end coupled to the first end of the seventh switch, a first end coupled to the RI pin, and a second end coupled to the second voltage.

9. The controlling circuit for a communication port according to claim 8, wherein the fourth switch, the sixth switch and the seventh switch are NPN BJTs, the fifth switch is the NMOS field-effect transistor, and the eighth switch is a PMOS field-effect transistor.

10. The controlling circuit for a communication port according to claim 8, wherein the second selection circuit further comprising:
    a ninth switch having a control end coupled to the control end of the fifth switch, a first end coupled to the second end of the fifth switch, and a second end coupled to the RI pin.

11. The controlling circuit for a communication port according to claim 10, wherein the ninth switch is for avoiding a current outputted by the eighth switch flowing to the fifth switch.

12. The controlling circuit for a communication port according to claim 10, wherein the ninth switch is the NMOS field-effect transistor.

* * * * *